(12) United States Patent
Hagman

(10) Patent No.: US 11,859,369 B1
(45) Date of Patent: Jan. 2, 2024

(54) SPRING PRELOADED LOCKUP CLUTCH

(71) Applicant: Caterpillar Inc., Peoria, IL (US)

(72) Inventor: Brandon L Hagman, Brimfield, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/893,794

(22) Filed: Aug. 23, 2022

(51) Int. Cl.
*E02F 9/20* (2006.01)
*F16H 45/02* (2006.01)

(52) U.S. Cl.
CPC .............. *E02F 9/202* (2013.01); *F16H 45/02* (2013.01); *F16H 2045/0284* (2013.01)

(58) Field of Classification Search
CPC .............. E02F 9/202; F16H 45/00–2045/0294
See application file for complete search history.

(56) References Cited

U.S. PATENT DOCUMENTS

| | | | |
|---|---|---|---|
| 3,128,642 A | | 4/1964 | Fisher et al. |
| 3,386,540 A | | 6/1968 | Horsch |
| 4,510,747 A | | 4/1985 | Yoshida |
| 6,974,008 B2 * | 12/2005 | Leber ...................... | F16H 45/02 192/3.3 |
| 9,951,830 B2 | | 4/2018 | Matsubara et al. |
| 10,001,179 B2 | | 6/2018 | Kimura et al. |
| 10,336,338 B2 | | 7/2019 | Nakamura et al. |
| 11,060,496 B2 | | 7/2021 | Fliearman et al. |
| 2004/0139743 A1 * | 7/2004 | Sato ...................... | F16D 41/066 60/345 |
| 2004/0206592 A1 * | 10/2004 | Abe ........................ | F16H 45/02 192/3.3 |
| 2012/0071294 A1 * | 3/2012 | Ishikawa ................... | B60L 7/18 477/4 |
| 2014/0083811 A1 * | 3/2014 | Ito .......................... | F16D 48/02 192/85.63 |
| 2020/0208723 A1 * | 7/2020 | Velthaus ................ | B60K 6/485 |

* cited by examiner

*Primary Examiner* — David R Morris
*Assistant Examiner* — Aimee Tran Nguyen
(74) *Attorney, Agent, or Firm* — Xsensus LLC

(57) ABSTRACT

A spring preloaded lockup clutch system comprises clutch disc(s), an input component, and an output component housed in a hydraulic fluid chamber of a torque converter, a lockup piston and a mechanical spring housed in a piston housing of the torque converter, and a relief valve coupled to the hydraulic fluid chamber. The clutch disc(s), when engaged, couples the input component to the output component. The lockup piston has a first end and a second end, engages with the clutch disc(s) when biased, and disengages from the clutch disc(s) when unbiased. The mechanical spring, coupled to the lockup piston at the second end, applies force to bias the lockup piston. The relief valve, when opened, relieves hydraulic pressure in the hydraulic fluid chamber allowing the lockup piston to remain being biased, and, when closed, allows the hydraulic pressure to build up allowing the lockup piston to be unbiased.

20 Claims, 8 Drawing Sheets

SPRING PRELOADED LOCKUP CLUTCH

TECHNICAL FIELD

The present disclosure relates to a system and method for engaging a lockup clutch when starting a prime mover with a torque converter, and more particularly, to a system and method for engaging a lockup clutch utilizing a mechanical spring during a prime mover startup.

BACKGROUND

Machines may be used to perform a variety of tasks at a worksite. For example, machines may be used to excavate, move, shape, contour, and/or remove material present at the worksite, such as gravel, concrete, asphalt, soil, and/or other materials. Some of these machines are large and powered by large engines with torque converters. A machine with a torque converter may have difficulty starting, especially in cold weather, due to hydraulic loads put on the engine by the torque converter. A lockup clutch, commonly utilized in a torque converter, can lower the engine load during a start but requires hydraulic pressure to engage, which takes extended time to build up pressure during a cold start, and the hydraulic pumps add additional loads to the engine. Applying the lockup clutch with hydraulic pressure, therefore, further loads the engine during a cold start, which can prevent the engine from starting under very cold conditions.

U.S. Pat. No. 11,060,496 by Fliearman, et al. ("the '496 patent"), issued Jul. 13, 2021, describes a combination starter-generator device for a work vehicle having an engine. The device described in the '496 patent includes an electric machine, which functions as a motor and a generator, and a gear set configured to receive rotational input from the electric machine and from the engine. As explained in the '496 patent, the device couples the electric machine and the engine in a first power flow direction and a second power flow direction. The gear set is configured to operate in one of multiple relatively high-torque, low-speed start gear ratios in the first power flow direction, such as a gear ratio of 60:1 during a cold start. The gear set described in the '496 patent is also configured to operate in a relatively low-torque, high-speed gear ratio in the second power flow direction, such as a gear ratio of 16:1 during a warm engine start.

Although the '496 patent describes a "spring applied, hydraulically released" engagement and disengagement mechanism for a clutch, the engagement of the clutch is limited to a cold start and a first power flow direction. Additionally, the disengagement of the clutch described in the '496 patent is limited to when an additional clutch is engaged for a warm start and a second power flow direction that is different from the first power flow direction. As a result, the clutch system of the '496 patent requires two clutch mechanisms, i.e., a first clutch mechanism for a cold start situation and a second clutch mechanism for a warm start situation.

The systems and methods described herein are directed to addressing one or more of the drawbacks set forth above.

SUMMARY

According to a first aspect a lockup clutch system may include one or more clutch discs operational to, when engaged, couple rotational force from an input component to an output component, the one or more clutch discs, the input component, and the output component housed in a hydraulic fluid chamber of a torque converter; a lockup piston housed in a piston housing of the torque converter, the lockup piston having a first end and a second end opposite of the first end, the lockup piston operational to: engage with the one or more clutch discs when the lockup piston is biased, and disengage from the one or more clutch discs when the lockup piston is unbiased; a mechanical spring housed in the piston housing and coupled to the lockup piston at the second end of the lockup piston, the mechanical spring operational to bias the lockup piston to engage with the one or more clutch discs.

According to another aspect, a machine may include a frame; a prime mover supported by the frame; and a torque convert coupled to the prime mover and supported by the frame, the torque converter housing a lockup clutch system, and the lockup clutch system may include one or more clutch discs operational to, when engaged, couple rotational force from an input component to an output component in the torque converter, the one or more clutch discs, the input component, and the output component housed in a hydraulic fluid chamber of the torque converter, a lockup piston housed in a piston housing of the torque converter, the lockup piston having a first end and a second end opposite of the first end, the lockup piston operational to: engage with the one or more clutch discs when the lockup piston is biased, and disengage from the one or more clutch discs when the lockup piston is unbiased, a mechanical spring housed in the piston housing and coupled to the lockup piston at the second end of the lockup piston, the mechanical spring operational to bias the lockup piston to engage with one or more clutch discs.

According to yet another aspect, a method may include monitoring, by an electronic control module (ECM) of a machine, a state of a prime mover of the machine; determining, by the ECM, the state of the prime mover; in response to determining, by the ECM, the state of the prime mover has changed from an engine-off state to an engine-on state, opening a relief valve coupled to a hydraulic fluid chamber of a torque converter of the machine, the hydraulic fluid chamber housing one or more clutch discs, an input component, and an output component, relieving hydraulic pressure from hydraulic fluid in the hydraulic fluid chamber, and biasing, by a mechanical spring, a lockup piston to engage with the one or more clutch discs to couple rotational force from the input component to the output component, the mechanical spring and the lockup piston housed in a piston housing of the torque converter; in response to determining, by the ECM, the state of the prime mover has reached a stable state, closing the relief valve, allowing the hydraulic pressure from the hydraulic fluid in the hydraulic fluid chamber to build up, and allowing the lockup piston to be unbiased to disengage from the one or more clutch discs.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1:
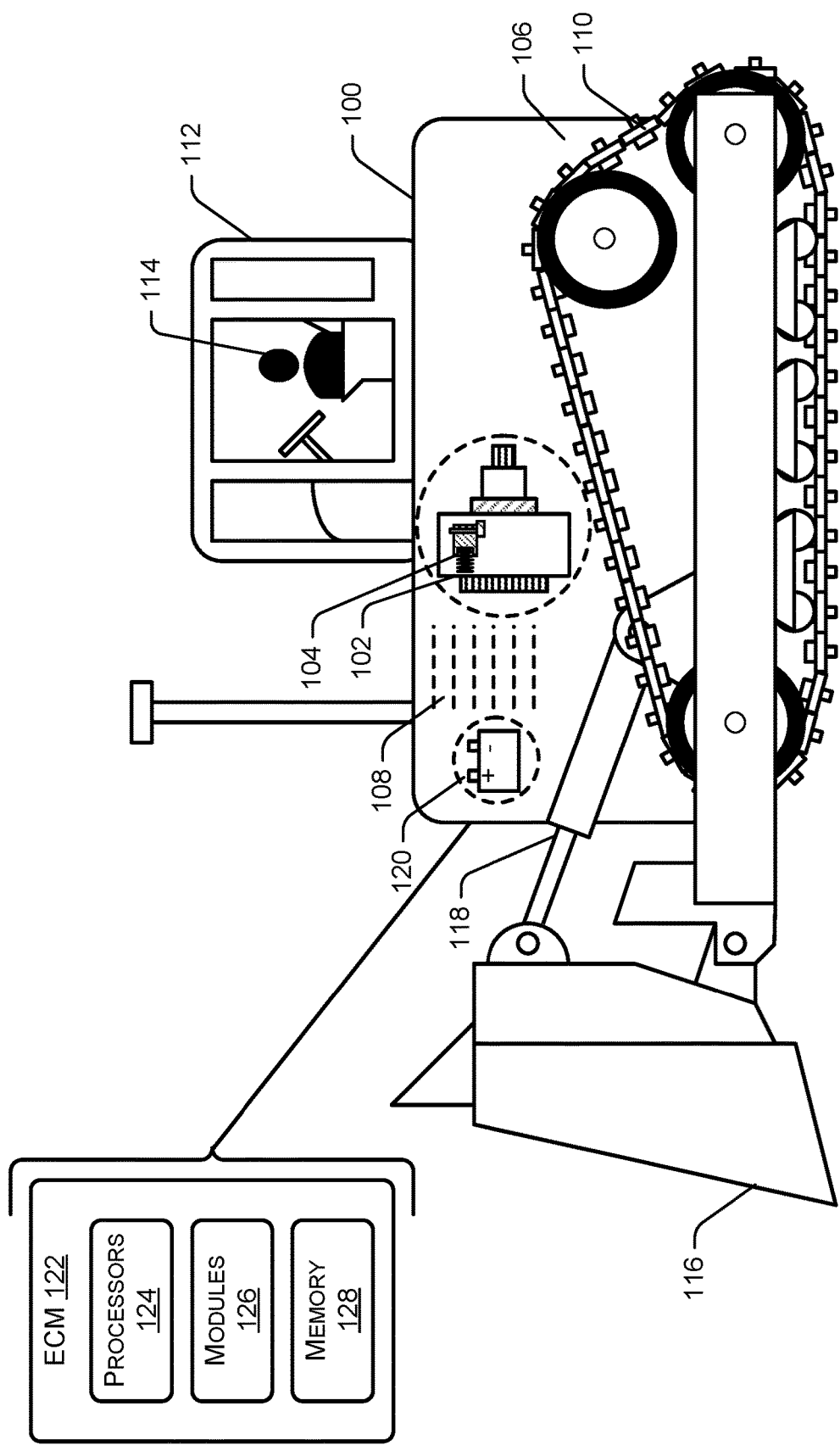
FIG. 1 illustrates a schematic side view of an example machine with a torque converter that includes a spring preloaded lockup clutch.

FIG. 1 is a schematic side view of an example machine 100 with a torque converter 102 which includes a spring preloaded lockup clutch 104. The example machine 100 shown in FIG. 1 is a bulldozer. However, the machine 100 may be any type of machine configured to travel across terrain, such as an automobile, a truck, an agricultural vehicle, and/or work vehicles, such as a wheel loader, a track loader, a skid-steer loader, a grader, an on-highway truck, an off-highway truck, and/or any other machine known to a person skilled in the art.

The machine 100 includes a chassis or frame 106 to which a prime mover 108 is attached. The prime mover 108 may include an internal combustion engine or "engine", a fuel cell, one or more batteries, or other prime mover types. The prime mover 108 is configured to supply power for operation of the machine 100, including, for example, operating work implements, electronics, and steering, and/or for supplying torque to drive members to propel the machine 100 across the terrain. For example, the machine 100 shown in FIG. 1 includes a pair of tracks 110 (only one set of tracks shown) that are configured to propel the machine 100 across pavement, gravel, dirt, or other work surfaces. Although the machine 100 includes tracks 110, it is contemplated that the machine 100 may include one or more wheels instead of, or in addition to, the tracks. The machine 100 also includes a cab 112 operationally connected to the frame 106 for protecting and/or providing comfort for an operator 114 of the machine 100, and/or for protecting control-related devices of the machine 100. In some examples, the machine 100 may be semi-autonomous or fully autonomous, and able to operate without an onboard or remote operator. In examples where the machine 100 is semi-autonomous or fully-autonomous, the machine 100 is prevented from, or avoids, accidentally colliding with or maneuvering undesirably close to other machines, personnel, and/or objects.

In the example shown in FIG. 1, the machine 100 also includes a work implement 116 for performing operations associated with the machine 100, such as digging, carrying, raising, and/or depositing material. Although the work implement 116 in FIG. 1 is illustrated as a shovel, other forms of work implements are contemplated. For example, the work implement 116 may include augers, brushcutters, brooms, grapples, hammers, pulverizers, rippers, rotors, and so forth. The machine 100 includes a work implement actuator 118 coupled at one end to the frame 106 and/or to the proximal end of the work implement 116. The work implement actuator 118 may be electric motors, hydraulic cylinders, or pneumatic cylinders. The work implement actuator 118 is configured to extend and retract, thereby pivoting the work implement 116 between an upright orientation and an at least partially inverted orientation, for example. In the upright orientation, the work implement 116 may hold material and in the at least partially inverted orientation, the work implement 116 may deposit or dump the material.

The machine 100 may include a battery 120 to power various electrical equipment in the machine 100. For example, the machine 100 may include an electronic control module (ECM) 122 that houses one or more processors 124, which may execute any modules, components, or systems associated with the machine 100, some of which may be housed in the ECM 122 as shown as modules 126. In some examples, the processors 124 may include a central processing unit (CPU), a graphics processing unit (GPU), both CPU and GPU, or other processing units or components known in the art. Additionally, each of the processors 124 may possess its own local memory, which also may store program modules, program data, and/or one or more operating systems.

Computer-readable media, such as memory 128, associated with the machine 100 may include volatile memory (e.g., RAM), non-volatile memory (e.g., ROM, flash memory, miniature hard drive, memory card, or the like), or some combination thereof. The computer-readable media may be non-transitory computer-readable media. The computer-readable media may include or be associated with the one or more of the above-noted modules, which perform various operations associated with the machine 100. In some examples, one or more of the modules may include or be associated with computer-executable instructions that are stored by the computer-readable media and that are executable by one or more processors to perform such operations.

Figure 2:
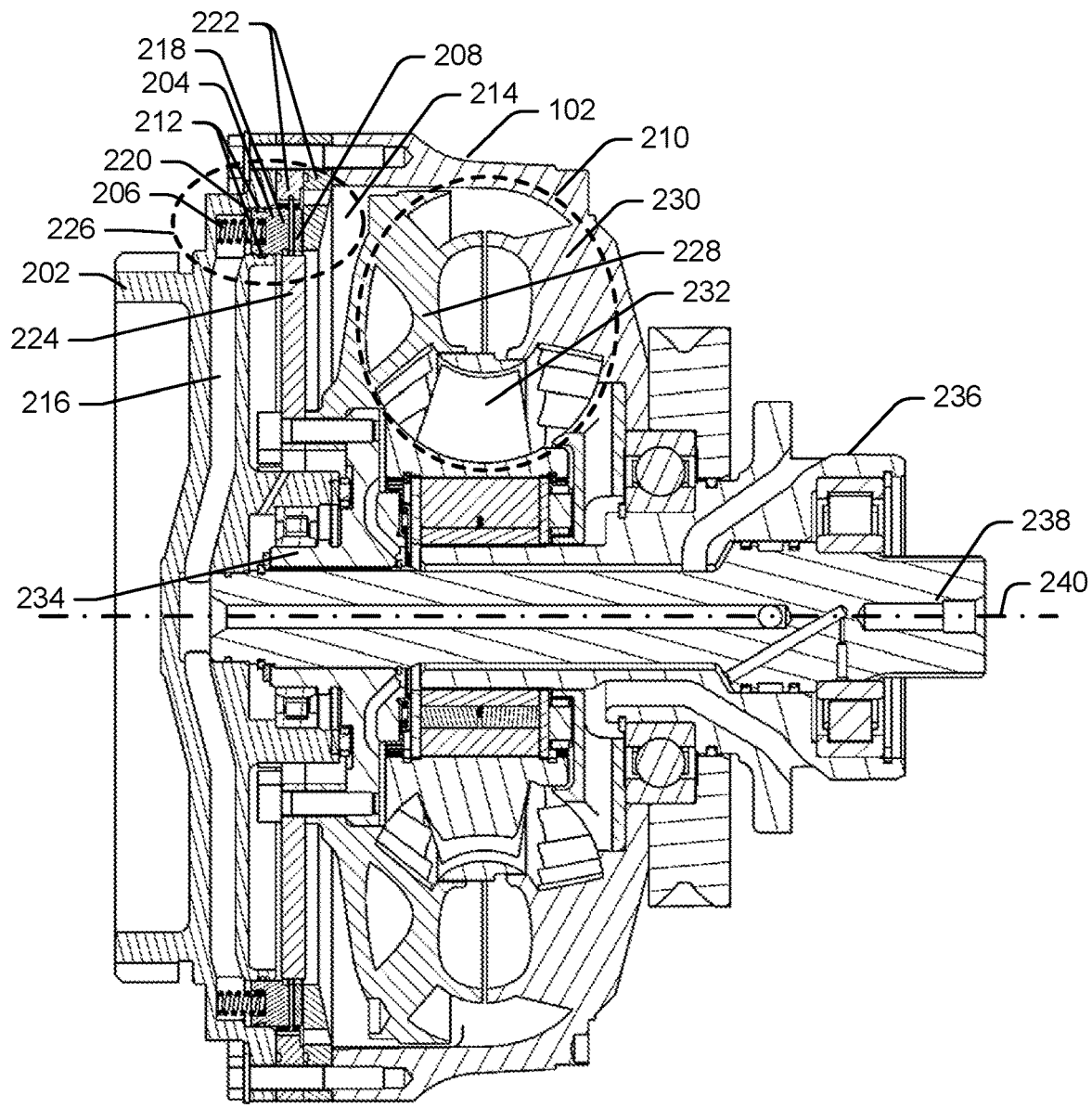
FIG. 2 illustrates a cross-sectional side view of the torque converter with spring preloaded lockup clutch components.

As discussed above, a machine with a torque converter, such as the machine 100 with the torque converter 102, may have difficulty starting the prime mover 108, especially in cold weather, due to hydraulic loads put on the prime mover 108 by the torque converter 102. As will be described in greater detail below, FIG. 2 provides a cross-sectional view 200 of the torque converter 102 with the spring preloaded lockup clutch 104 with associated components to address the difficulty of starting the prime mover 108. The spring preloaded lockup clutch 104 of the torque converter 102 comprises a piston housing 202 housing a lockup piston 204 and a mechanical spring 206. While the lockup piston 204 and the mechanical spring 206 are described as singular in this example, the lockup piston 204 may comprise one or more lockup pistons and the mechanical spring 206 may comprise one or more mechanical springs.

The mechanical spring 206, placed behind the lockup piston 204, may exert force against the inside of the piston housing 202 and on the lockup piston 204 to engage a clutch disc 208 in an oil cavity of the torque converter 102 while using hydraulic pressure during a prime mover start up. The mechanical spring 206 may be any type of resistance device or source of resistance suitable for this application. Such mechanical springs 206 may include, among other things, a wave spring, a Belleville disc spring, multiple coil springs, or other spring devices. The mechanical spring 206 exerts force on the lockup piston 204 to engage the clutch disc 208 when there is low pressure in a hydraulic system of the torque converter 102, for example, during the prime mover start up. The clutch side of the lockup piston 204 is normally submerged in, and is in contact with, pressurized torque converter torus oil. In some examples, the torque converter torus oil may be partially drained when the prime mover is turned off and the torque convert is refilled upon a startup. An electronically controlled relief valve (not shown) may be utilized to allow an electronic control module (ECM), such as the ECM 122, to bypass torque converter (TC) pressure allowing the clutch disc 208 to stay engaged. The relief valve can raise pressure and allow the lockup piston 204 to fully retract after the prime mover reaches a stable state, which may be based on ECM input(s) such as engine speed and/or TC ratio. The lockup piston 204 then returns to normal machine control with hydraulic operation at raised TC pressure, for example, when the prime mover 108 has reached a stable state, which in this example, may include when the prime mover engine speed settles to an idle speed, while the prime mover engine speed is ramping up to idle, or other conditions in which the engine stalling is unlikely and the prime mover 108 is able to handle additional loading without issue. Further, the mechanical spring 206 may be sized to apply pressure in balance with a rotating head and pressure of the torque converter 102. The mechanical spring 206 provides higher force than hydraulic fluid on a torus side at low speeds, for example, below the prime mover speed at the stable state. As a torus 210 spins faster and builds hydraulic pressure, the hydraulic pressure overcomes the force exerted by the mechanical spring 206 on the lockup piston 204, and the lockup piston 204 retracts from the clutch disc 208. The lockup piston 204 then returns to normal machine control with hydraulic operation.

The lockup piston 204 is sealed by piston seals 212 such that separate hydraulic pressures in a hydraulic fluid chamber 214 and a piston hydraulic passage 216 may be maintained or controlled. The lockup piston 204, at a first end 218, engages the clutch disc 208 as the mechanical spring 206 exerts force on the lockup piston 204 at a second end 220 of the lockup piston 204. The clutch disc 208, located within the hydraulic fluid chamber 214, is engaged by the mechanical spring 206, via a reaction plate 222, when the hydraulic pressure in the hydraulic fluid chamber 214 is sufficiently low. While the clutch disc 208, which may be coupled to a clutch hub 224, and the reaction plate 222 are described as singular in this example, the clutch disc 208 may comprise one or more clutch discs and the reaction plate 222 may comprise one or more reaction plates. Some components of the spring preloaded lockup clutch 104 are identified and enclosed by a dotted line circle 226. In the hydraulic fluid chamber 214, rotational components include a turbine 228 and an impeller 230 which spin around a stator 232 forming the torus 210. The turbine 228 is coupled to a turbine hub 234 and the stator 232 is supported by a stator support 236. The impeller 230 uses rotational force from the prime mover 108 to accelerate hydraulic fluid inside the torus 210. This flow reacts with the turbine blades of the turbine 228 to transmit rotational force out of the torque converter 102 through the turbine hub 234 and an output shaft 238. Hydraulic fluid exiting the turbine 228 is redirected by the stator 232 back to the impeller 230. A resulting rotational motion is output by the output shaft 238. The components of the torque converter 102 described above are substantially symmetric about a center axis 240.

A lockup clutch, such as the spring preloaded lockup clutch 104, may be utilized in a torque converter, such as the torque converter 102, to transmit rotation force between an input component and an output component of the torque converter 102. The rotational force can be transmitted in either direction, for example, from the input to the output or from the output to the input. The spring preloaded lockup clutch 104 may be connected, or coupled, to a variety of components within the torque converter 102 as long as it provides a rotational force path between the input component and the output component. In some examples, a primary input component is referred to as an impeller, such as the impeller 230. The primary input component may also be, or may also be referred to as, a housing, an impeller attached to the housing, or other part receiving engine, or input, power. A primary output component may commonly be referred to as a turbine, such as the turbine 228. The primary output component may also be, or may also be referred to as, a hub, an output shaft, or other part that transmits rotational force out of the torque converter 102.

Figure 3:
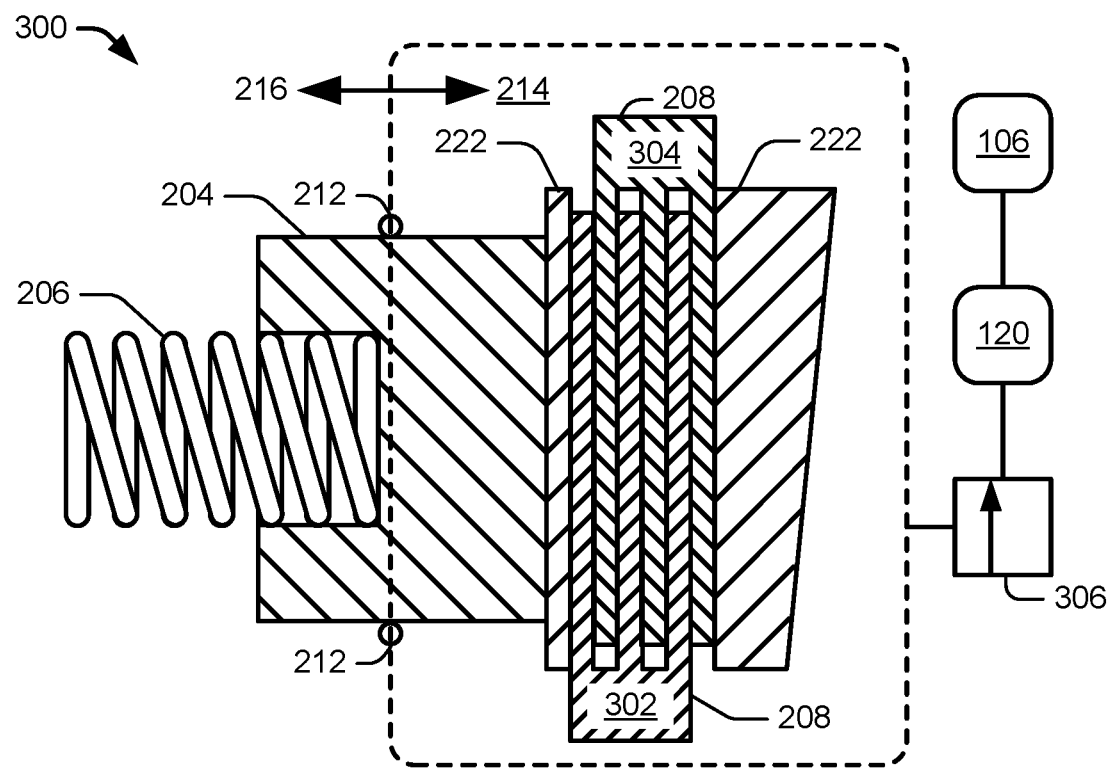
FIG. 3 illustrates a schematic diagram of some of the components of the spring preloaded lockup clutch engaged with the clutch discs.

FIG. 3 illustrates a schematic diagram 300 of some of the components of the spring preloaded lockup clutch 104 in the dotted line circle 226 of FIG. 2 engaged with the clutch disc 208. In this example, the lockup piston 204 is illustrated as being biased by the mechanical spring 206, or in a first position, engaging with the clutch disc 208. The components illustrated herein are exaggerated in shape and size or omitted for clarity. As discussed above with reference to FIG. 2, the clutch disc 208 in this example is illustrated as comprising multiple discs, a first clutch disc set 302 and a second clutch disc set 304, where the first clutch disc set 302 may be coupled to the turbine 228 and the second clutch disc set 304 may be coupled to the impeller 230.

A relief valve 306 is coupled to the hydraulic fluid chamber 214 and controls the hydraulic pressure in the hydraulic fluid chamber 214. The hydraulic fluid chamber 214 is shown to be on one side of the piston seals 212 and isolated from the piston hydraulic passage 216, which is shown to be on the other side of the piston seals 212. When the prime mover 108 of the machine 100 is off, which may be referred to as an engine-off state, one of the states of the prime mover 108, the relief valve 306 is open, and relieves hydraulic pressure previously built up in, and/or prevents hydraulic pressure from building up in, the hydraulic fluid chamber 214. The ECM 122, as a controller, may control the state, open or closed, of the relief valve 306. For example, the ECM 122 may monitor the state of the prime mover 108 and/or the state of the prime mover starting process, such as the ignition switch/key/dial, and open the relief valve 306 in response to determining that the prime mover 108 is off, or in the engine-off state. Because the hydraulic pressure in the hydraulic fluid chamber 214 is low, the mechanical spring 206 exerts sufficient force on the lockup piston 204 on the second end 220 to overcome the force due to the hydraulic pressure in the hydraulic fluid chamber 214 and maintains the lockup piston 204 biased. As the lockup piston 204 is biased, the lockup piston 204 engages with the clutch disc sets 302 and 304, that is, the lockup piston 204 provides sufficient force on the clutch disc sets 302 and 304 such that rotational motion is transferred from the clutch disc set 302 to the clutch disc set 304, or vice versa.

Compared to a conventional lockup clutch system, which requires the prime mover to be turned over to activate hydraulic pumps to build up the pressure in the piston hydraulic passage 216 to engage the clutch disc 208, the spring preloaded lockup clutch 104 described above provides the clutch engagement at the beginning of the starting process of the prime mover 108. Additionally, because the clutch disc sets 302 and 304 are already engaged and the hydraulic pressure in the hydraulic fluid chamber 214 is low, the spring preloaded lockup clutch 104 reduces hydraulic load on the prime mover 108 when starting the prime mover 108 and improves the prime mover starting process.

Figure 4:
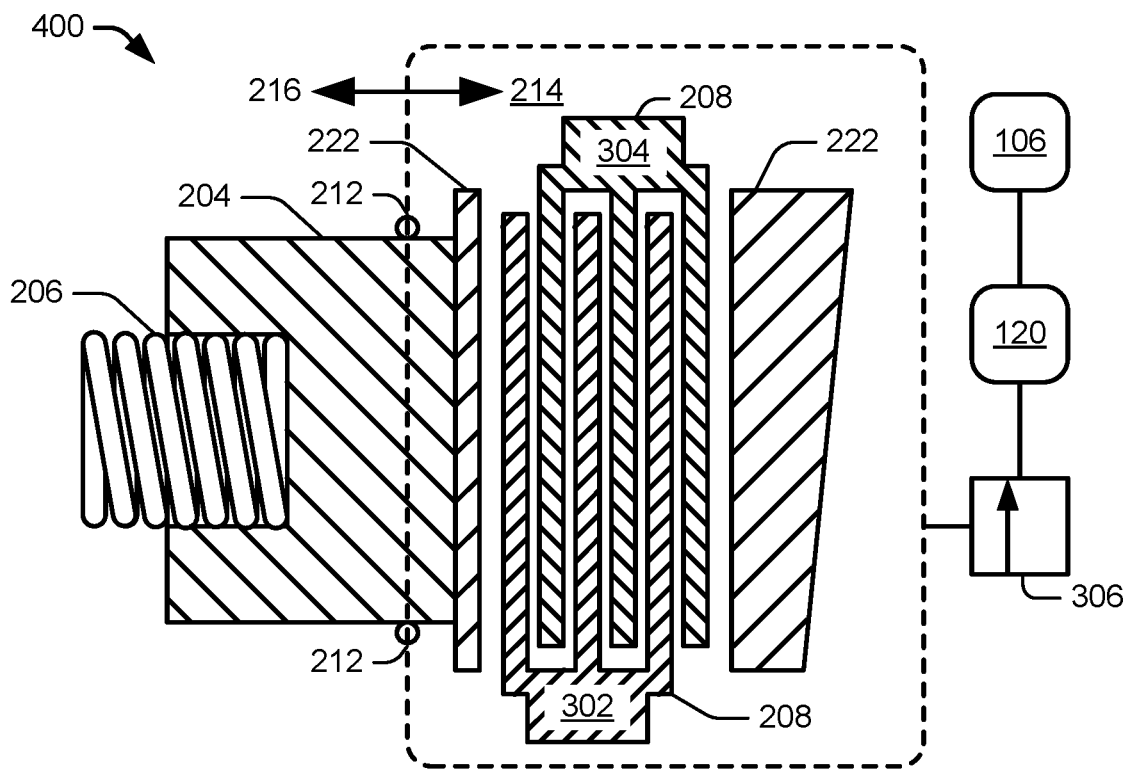
FIG. 4 illustrates a schematic diagram of some of the components of the spring preloaded lockup clutch disengaged from the clutch discs.

FIG. 4 illustrates a schematic diagram 400 of some of the components of the spring preloaded lockup clutch 104 in the dotted line circle 226 of FIG. 2 disengaged from the clutch disc 208. In this example, the lockup piston 204 is illustrated as being unbiased by the mechanical spring 206, or in a second position, disengaging form the clutch disc 208. The components illustrated herein are exaggerated in shape and size or omitted for clarity. The difference between the first position and the second position is that in the first position the lockup piston 204 contacts and applies force to the clutch disc 208, whereas in the second position the lockup piston 204 does not contact and apply force to the clutch disc 208. Accordingly, the distance between the first position and the second position can be, but need not be, extremely small, possibly a fraction of a millimeter. In response to detecting the prime mover 108 being started and/or the ignition switch/key/dial indicating the prime mover starting process, the ECM 122 determines the state of the prime mover to be an engine-on state. After the prime mover 108 is started with the clutch disc sets 302 and 304 engaged and reaches the stable state, the ECM 122 may close the relief valve 306 and allow the hydraulic pressure in the hydraulic fluid chamber 214 to build up.

As described above with regard to FIG. 3, the prime mover 108 is started having the clutch disc sets 302 and 304 already engaged by the mechanical spring 206 without waiting for the hydraulic pressure to build up or additional hydraulic load from the hydraulic pumps. As the prime mover 108 is started (engine-on state), the ECM 122 also monitors the prime mover engine speed, for example, the revolution per minute (rpm) of the prime mover 108, as the status of the prime mover 108. In general, the prime mover 108 is started with a starter motor (not shown) spinning the prime mover 108 till the prime mover 108 is able to self-maintain running of the prime mover 108 (the stable state), and the prime mover 108 settles to its idle speed after some time. The ECM 122 may keep the relief valve 306 open util the prime mover 108 has reached the stable state. Upon determining that that the prime mover 108 has reached the stable state, the ECM 122 may close the relief valve 306 and allow the hydraulic pressure in the hydraulic fluid chamber 214 to build up. The ECM 122 may determine that the prime mover 108 has reached the stable state when the prime mover speed has remained greater than a preselected engine speed for a preselected period of time. For example, the preselected prime mover speed may be lower than a prime mover idle speed by a preselected amount, such as 100 rpm below the prime mover idle speed of 800 rpm, and the preselected period of time may be five seconds or any appropriate duration.

With the relief valve 306 closed, the hydraulic pressure in the hydraulic fluid chamber 214 reaches a sufficiently high level at the prime mover idle speed to overcome the force applied by the mechanical spring 206 such that the lockup piston 204 is unbiased, which is shown as the lockup piston 204 pushed back to the second position, and is disengaged from the clutch disc 208. The mechanical spring 206 may be selected to provide appropriate force, that is, the force provided by the mechanical spring 206 is strong enough to bias the lockup piston 204 to engage with the clutch disc 208 but is still able to be unbiased by the hydraulic pressure in the hydraulic fluid chamber 214 at and above the preselected engine speed, or at the stable state. After the ECM 122 closes the relief valve 306, the ECM 122 may operate the torque converter 102 as a conventional hydraulic torque converter where the engagement of the clutch disc 208 is controlled by the pressure in the piston hydraulic passage 216. The ECM 122 may keep the relief valve 306 closed while the prime mover speed is greater than the preselected engine speed.

In response to detecting the state of the prime mover has changed from the engine-on state to the engine-off state, that is, the prime mover 108 is being turned off, the ECM 122 may open the relief valve 306 to relieve the hydraulic pressure built up in the hydraulic fluid chamber 214 while the prime mover 108 was on such that the lockup piston 204 biased by the force exerted by the mechanical spring 206 and engages with the clutch disc 208.

Additionally, or alternatively, the spring preloaded lockup clutch 104 may be selectively utilized when the temperature is low such that the hydraulic fluid in the hydraulic fluid chamber 214 would add extra loads to the prime mover 108 when started due to its viscosity at the low temperature. For example, a temperature sensor may be utilized to monitor the temperature of the hydraulic fluid in the hydraulic fluid chamber 214 or the outside temperature. In response to detecting the prime mover 108 being started and/or the ignition switch/key/dial indicating the prime mover starting process, the ECM 122 may determine the state of the prime mover 108 to be an engine-on state and check the temperature. If the ECM 122 determines the temperature to be lower than a preselected temperature, for example, 0° C., the ECM 122 opens the relief valve 306 to relieve hydraulic pressure previously built up in, and/or to prevent hydraulic pressure from building up in, the hydraulic fluid chamber 214 to reduce the load on the prime mover 108 during a cold startup. Thereafter, the ECM 122 may control the relief valve 306 as described above with reference to FIGS. 3 and 4.

Alternatively, the spring preloaded lockup clutch 104 may be utilized without the relief valve 306. When the prime mover 108 is off (the engine-off state) and the hydraulic fluid in the hydraulic fluid chamber 214 is stationary, the hydraulic pressure in the hydraulic fluid chamber 214 is low. The force the mechanical spring 206 applies to the lockup piston 204 is sufficient to overcome the hydraulic pressure in the hydraulic fluid chamber 214 and move the lockup piston 204 to the first position as shown in FIG. 3, thereby engaging the clutch disc 208. In this example, because there is no relief valve 306 to relieve the hydraulic pressure in the hydraulic fluid chamber 214, the hydraulic pressure in the hydraulic fluid chamber 214 increase due to a rotating head of the hydraulic fluid as the prime mover speed increases after the prime mover 108 is started. The mechanical spring 206 may be selected such that the hydraulic pressure in the hydraulic fluid chamber 214, at the preselected prime mover speed, exerts sufficient force on the lockup piston 204 to be unbiased as shown in FIG. 4 and disengage from the clutch disc 208. Thereafter, the ECM 122 may operate the torque converter 102 as a conventional hydraulic torque converter where the engagement of the clutch disc 208 is controlled by the pressure in the piston hydraulic passage 216.

While the prime mover speed, such as the rpm of the prime mover 108, has been used as one of the states of the prime mover 108 for the examples describe above, other parameters indicative of the running state of the prime mover 108 may also utilized. For example, a fuel consumption rate, an air volume intake rate, an exhaust particle concentration, electrical current, voltage, and others, that are indicative of a current running state of the prime mover 108 may be utilized.

Figure 5:
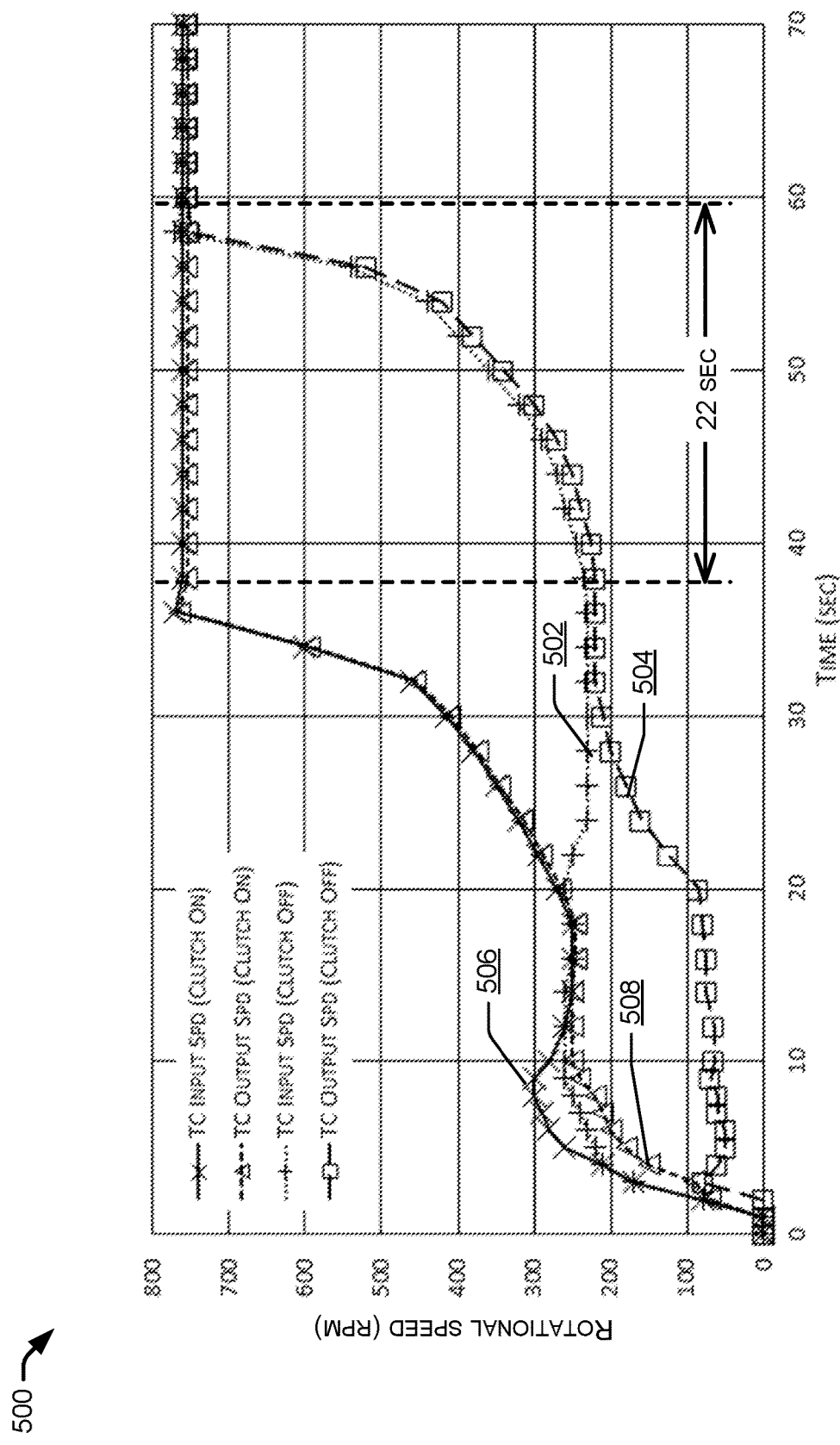
FIG. 5 provides an example graph illustrating torque converter input and output speed over time, with and without the lockup clutch.

FIG. 5 provides an example graph 500 illustrating torque converter input and output speed over time with and without the spring preloaded lockup clutch 104. The torque converter input speed, or input speed, is generally equal to, directly proportional to, the engine speed of the prime mover 108, shown as an engine in this example, as the prime mover 108 drives the input, such as the impeller 230. The input then drives the output, such as the turbine 228, via the clutch disc 208. The output, such as the turbine 228 may also be driven hydraulically by fluid forces from the input, such as the impeller 230.

Graph lines 502 and 504 represent speeds of the input and output, respectively, of a conventional torque converter without utilizing a lockup clutch. As discussed above, the conventional torque converter requires hydraulic fluid pressure, which adds loads to the engine and takes some time to build up after the engine is started, to hydraulically couple the input and the output. The graph line 504 for the output speed shows that the output speed lags significantly compared to the input speed due to churning losses, the graph line 502, for over 30 seconds due to the time required to build up the hydraulic pressure for sufficiently couple the rotational force from the input to the output. The output speed continues to lag behind the input speed till about 55 seconds, and the engine settles to the idle speed at about 60 seconds.

Graph lines 506 and 508 represent speeds of the input and output, respectively, of a torque converter, such as the torque converter 102, when the spring preloaded lockup clutch 104 is utilized. As discussed above with reference to FIG. 3, with the spring preloaded lockup clutch 104, the clutch disc 208 is engaged before the prime mover 108 is started and the input and the output are already coupled via the clutch disc 208. The graph line 508 for the output speed shows that the output speed lags compared to the input speed, the graph line 506, for about 15 seconds, then substantially matches the input speed. The spring preloaded lockup clutch 104, when engaged, can still have different speeds of input and output. The spring preloaded lockup clutch 104 may simply slip some amount due to the high load especially when it is initially engaged. However, the rotational force is still being transmitted through the clutch disc 208. As the load drops, the speeds of the input and the output synchronizes and the clutch disc 208 slips less and less then not at all. The prime mover 108 settles to the idle speed at about 38 seconds where the input and the output are synchronized, which shows about a 22 second start up improvement over the conventional torque converter.

Figure 6:
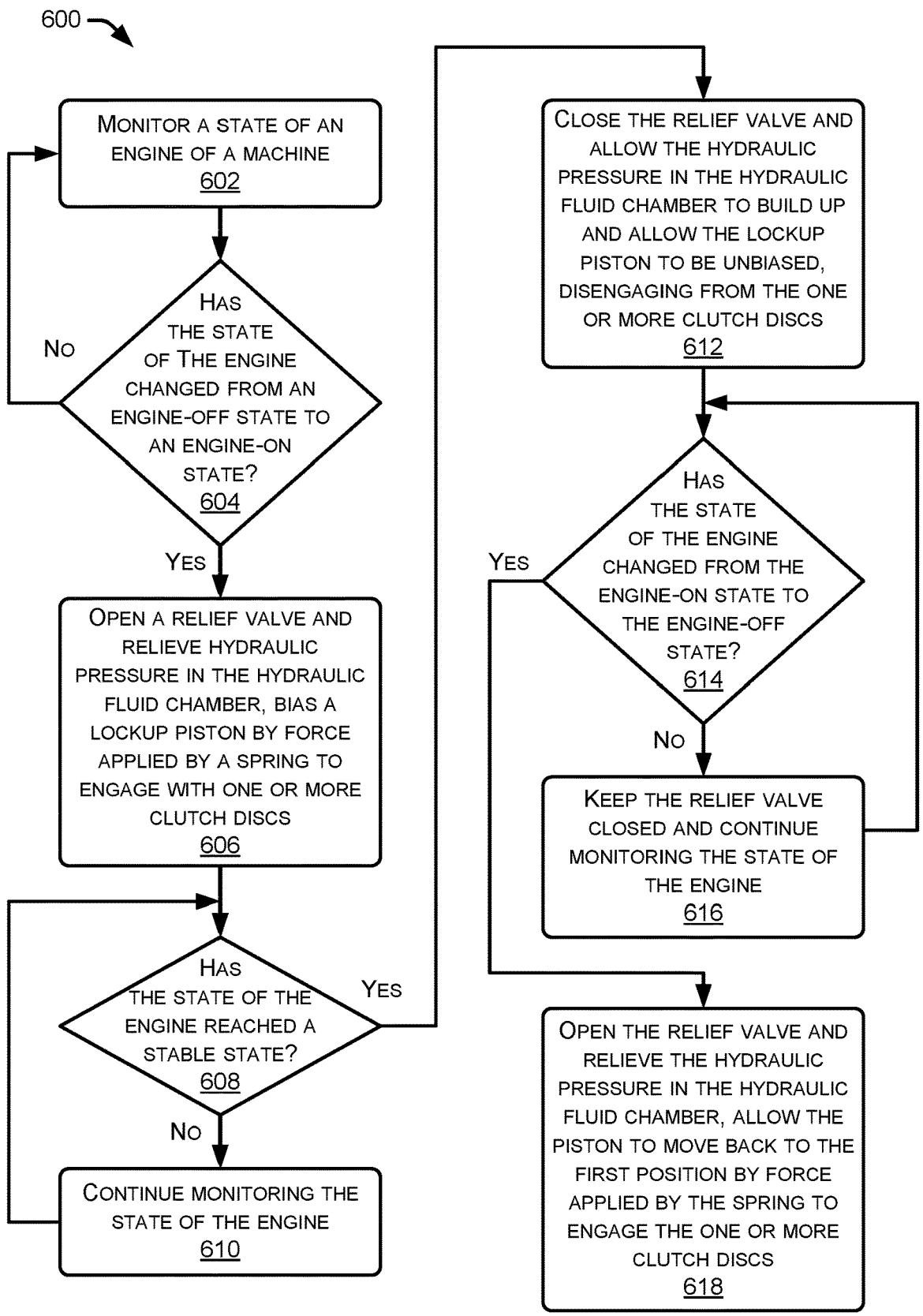
FIG. 6 provides a flow chart representing an example process of the spring preloaded lockup clutch engagement and disengagement.

FIG. 6 provides a flow chart 600 representing an example process of the spring preloaded lockup clutch engagement and disengagement. The process 600 is illustrated as a logical flow graph, operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the process.

As described above with reference to FIGS. 2, 3, and 4, the mechanical spring 206 exerts force on the lockup piston 204 such that the lockup piston 204 is biased (show as being pushed to the first position in FIG. 3) and engages with the clutch disc 208 when the prime mover 108 is off (the engine-off state) with the relief valve 306 open to relieve the hydraulic pressure in the hydraulic fluid chamber 214.

At block 602, the ECM 122 may monitor a state of an engine, such as the prime mover 108 of the machine 100, and determine whether the state of the prime mover 108 has changed from an engine-off state to an engine-on state at block 604. The ECM 122 may continue to monitor the state of the prime mover 108 if no change in the state of the prime mover 108 is detected. For example, the ECM 122 may monitor an ignition switch/key/dial of the machine to determine whether the state of the prime mover 108 has changed from the engine-off state to the engine-on state. Based on the ignition switch having been moved to the "ON" position from the "OFF" position, or the prime mover 108 having been turned on, the ECM 122 may infer that the prime mover 108, which had been previously turned off, has been turned on, and determine that the state of the prime mover 108 has changed from the engine-off state to the engine-on state. In response to the ECM 122 determining that the state of the prime mover 108 has changed from the engine-off state to the engine-on state in block 604, the ECM 122 may open a relief valve, such as the relief valve 306, coupled to the hydraulic fluid chamber 214 of the torque converter 102 at block 606. As previously described above with reference to FIGS. 2-4, the hydraulic fluid chamber 214 houses the clutch disc 208, the impeller 230, and the turbine 228. The relief valve 306, when open, is operational to relieve hydraulic pressure from hydraulic fluid in the hydraulic fluid chamber 214, and allow the lockup piston 204 to be biased by the force applied by the mechanical spring 206 and to engage with the clutch disc 208 to couple rotational force from the impeller 230 to the turbine 228, or vice versa.

At block 608, the ECM 122 may determine whether the state of the prime mover 108 has reached a stable state. The stable state may be based, at least in part, on a speed of the prime mover 108 remaining greater than a preselected engine speed for a preselected period of time. The stable state, in this example, may include when the prime mover engine speed settles to an idle speed, while the prime mover engine speed is ramping up to idle, or other conditions in which the engine stalling is unlikely and the prime mover 108 is able to handle additional loading without issue. For example, the preselected engine speed may be lower than the prime mover idle speed by a preselected amount, such as 100 rpm below the prime mover idle speed of 800 rpm, and the preselected period of time may be five seconds or any appropriate duration. If the ECM 122 determines that the state of the prime mover 108 has not reached the stable state at block 608, the ECM 122 continues monitoring the state of the prime mover 108 at block 610, and the process loops back to block 608. In response to the ECM 122 determining the state of the prime mover 108 has reached a stable state at block 608, the ECM 122 may close the relief valve 306 at block 612. The relief valve 306, when closed, is further operational to allow the hydraulic pressure from the hydraulic fluid in the hydraulic fluid chamber 214 to build up and allow the lockup piston 204 to be unbiased due to the force on the lockup piston 204 generated by the hydraulic pressure in the hydraulic fluid chamber 214. As the lockup piston 204 is unbiased, the lockup piston 204 disengages from the clutch disc 208. After the ECM 122 closes the relief valve 306 at block 612, the ECM 122 may operate the torque converter 102 as a conventional hydraulic torque converter where the engagement of the clutch disc 208 is controlled by the pressure in the piston hydraulic passage 216.

At block 614, the ECM 122 may determine whether the state of the prime mover 108 has changed from the prime mover-on state to the prime mover-off state. If the ECM 122 determines that the state of the prime mover 108 has not changed from the prime mover-on state to the prime mover-off state at block 614, the ECM 122 keeps the relief valve 306 closed and continues monitoring the state of the prime mover 108 at block 616, and the process loops back to block 614. In response to the ECM 122 determining the state of the prime mover 108 has changed from the prime mover-on state to the prime mover-off state indicating that the prime mover 108 has been turned off at block 614, the ECM 122 may open the relief valve 306 at block 618. As described above, with the prime mover 108 off and the relief valve open, the hydraulic pressure in the hydraulic fluid chamber 214 is low, and the lockup piston 204 becomes biased by the force applied by the mechanical spring 206 and engages with the clutch disc 208 ready to couple the rotational force from the impeller 230 to the turbine 228.

While the prime mover engine speed, such as the rpm of the prime mover 108, has been used as one of the states of the prime mover 108 for the examples describe above, other parameters indicative of the running state of the prime mover 108 may also utilized. For example, a fuel consumption rate, an air volume intake rate, an exhaust particle concentration, and others, that are indicative of a current running state of the prime mover 108 may be utilized.

Figure 7:
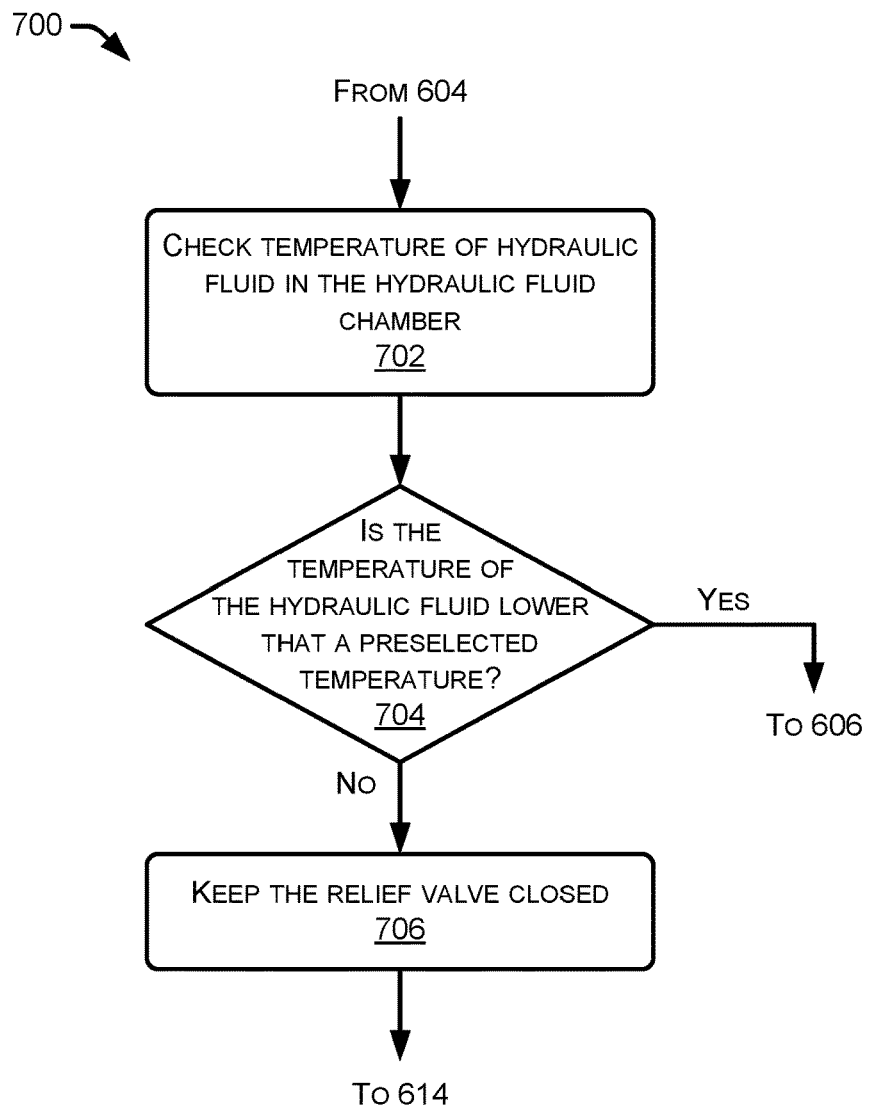
FIG. 7 provides a flow chart representing an example addition or alternative process of the spring preloaded lockup clutch engagement and disengagement for a cold start.

FIG. 7 provides flow chart 700 representing an example addition or alternative process of the spring preloaded lockup clutch engagement and disengagement for a cold start. Additionally, or alternatively, the spring preloaded lockup clutch 104 may be selectively utilized when the temperature is low such that the hydraulic fluid in the hydraulic fluid chamber 214 would add extra loads to the prime mover 108 when started due to its viscosity at the low temperature.

For example, in response to the ECM 122 determining that the state of the prime mover 108 has changed from the prime mover-off state to the prime mover-on state in block 604, the ECM 122 may check the temperature of the of the hydraulic fluid in the hydraulic fluid chamber 214 at block 702 by, for example, utilizing a temperature sensor. Alternatively, the outside air temperature may be used. At block 704, the ECM 122 may determine whether the temperature of the hydraulic fluid is lower than a preselected temperature, for example, 0° C. If the ECM 122 determines that the temperature of the hydraulic fluid is lower than the preselected temperature at block 704, the process follows the steps as described with reference to FIG. 6 from block 606. If the ECM 122 determines that the temperature of the hydraulic fluid is not lower than the preselected temperature at block 704, then the ECM 122 keeps the relief valve 306 closed at block 706. The process then follows the steps as described with reference to FIG. 6 from block 614.

Figure 8:
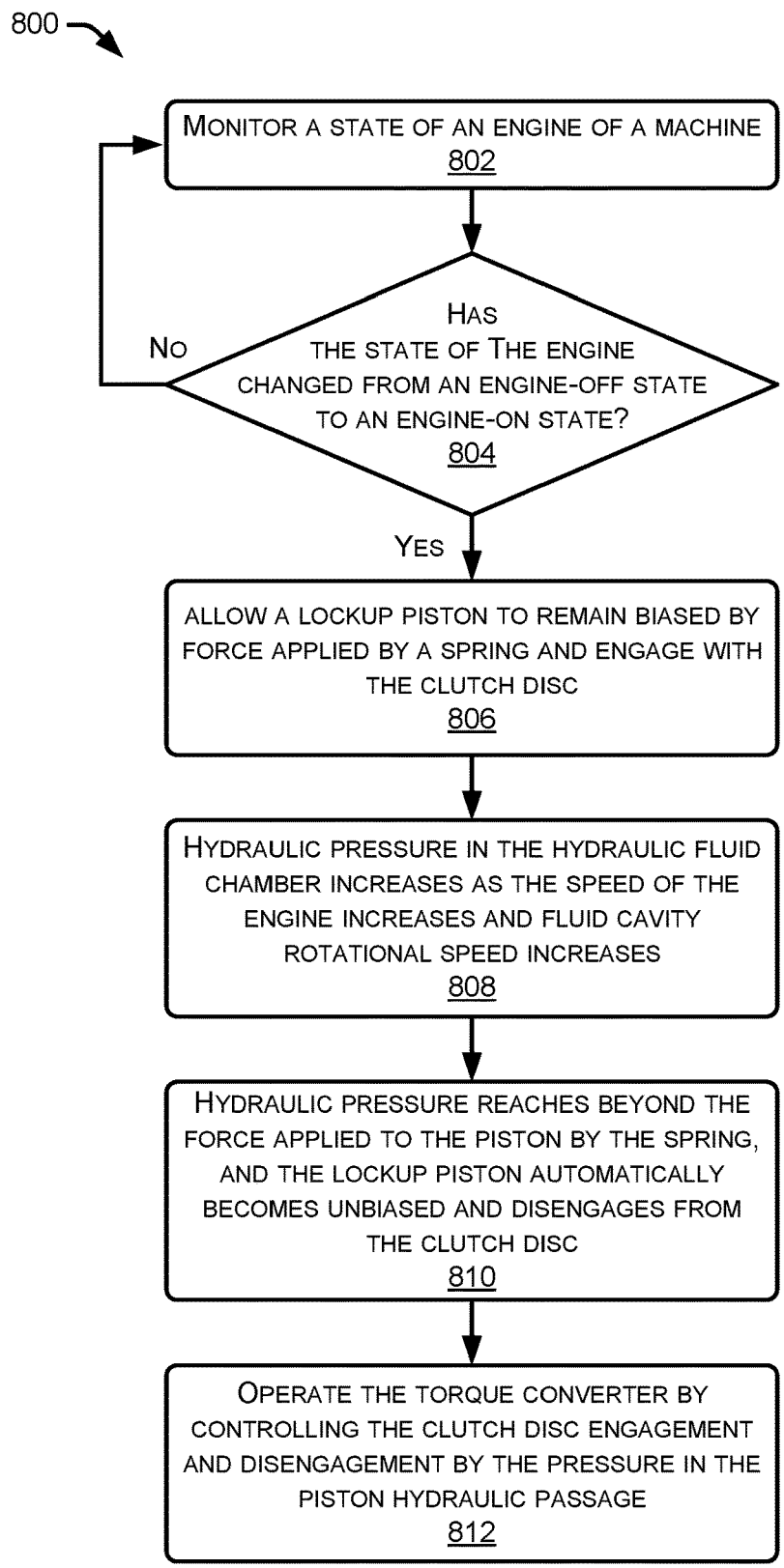
FIG. 8 provides a flow chart representing an example process of the spring preloaded lockup clutch engagement and disengagement without a relief valve.

FIG. 8 provides a flow chart 800 representing an example process of the spring preloaded lockup clutch engagement and disengagement without a relief valve. As described above with reference to FIGS. 2, 3, and 4, the mechanical spring 206 exerts force on the lockup piston 204 such that the lockup piston 204 is biased and engages the clutch disc 208 when the prime mover 108 is off (the prime mover-off state) and there is low hydraulic pressure in the hydraulic fluid chamber 214 due to no rotational motion of the hydraulic fluid.

At block 802, the ECM 122 may monitor a state of a prime mover, such as the prime mover 108 of the machine 100, and determine whether the state of the prime mover 108 has changed from an engine-off state to an engine-on state at block 604. The ECM 122 may continue to monitor the state of the prime mover if no change in the state of the prime mover 108 is detected. For example, the ECM 122 may monitor an ignition switch/key/dial of the machine to determine whether the state of the prime mover 108 has changed from the prime mover-off state to the prime mover-on state. Based on the ignition switch having been moved to the "ON" position from the "OFF" position, or the prime mover 108 having been turned on, the ECM 122 may infer that the prime mover 108, which had been previously turned off, has been turned on, and determine that the state of the prime mover 108 has changed from the prime mover-off state to the prime mover-on state. As previously described above with reference to FIGS. 2, 3, and 4, the hydraulic fluid chamber 214 houses the clutch disc 208, the impeller 230, and the turbine 228. In response to the ECM 122 determining that the state of the prime mover 108 has changed from the prime mover-off state to the prime mover-on state in block 804, the ECM 122 may allow the lockup piston 204 to remain biased by the force applied by the mechanical spring 206 and engage with the clutch disc 208 to couple rotational force from the impeller 230 to the turbine 228 at block 806.

At block 808, as the prime mover 108 is started and the speed of the prime mover increases, the hydraulic fluid in the hydraulic fluid chamber 214 builds hydraulic pressure as fluid cavity rotational speed increases due to the rotating head of the hydraulic fluid. When the hydraulic pressure due to the rotating head of the hydraulic fluid exceeds the force applied to the lockup piston 204 by the mechanical spring 206, the lockup piston 204 automatically becomes unbiased and disengages from the clutch disc 208 at block 810. After the lockup piston 204 retracts, the ECM 122 may operate the torque converter 102 as a conventional hydraulic torque converter where the engagement of the clutch disc 208 is controlled by the pressure in the piston hydraulic passage 216 at block 812.

INDUSTRIAL APPLICABILITY

The example systems and methods of the present disclosure are applicable to a variety of machines, such as, for example, an automobile, marine vehicles, a truck, an agricultural vehicle, a paving machine, a mining machine, and/or construction vehicles. The systems and methods described herein may be used in association with a hydraulically operated torque converter for a large machine. For example, to reduce load on a prime mover, such as an internal combustion engine, when starting up, pressure in a hydraulic fluid chamber may be reduced and an impeller and a turbine may be coupled via clutch discs based on force of a mechanical spring instead of hydraulic pressure. Once the prime mover has started and settled to idle, the torque converter operation may revert to a conventional torque converter operation by controlling hydraulic pressure to engage and disengage the clutch disc(s).

For example, a mechanical spring and a lockup piston are housed in a piston housing, and the mechanical spring exerts force on the lockup piston such that the lockup piston is biased and engages with the clutch disc when the prime mover is off (the engine-off state). In the engine-off state, there is low hydraulic pressure in the hydraulic fluid chamber due to no rotational motion of the hydraulic fluid. The ECM may monitor an ignition switch/key/dial of the machine to determine whether the state of the prime mover has changed from the engine-off state to the engine-on state. In response to determining that the state of the prime mover has changed from the engine-off state to the engine-on state, the ECM, by opening a relief valve coupled to the hydraulic fluid chamber, allows the lockup piston to remain biased by the force applied by the mechanical spring and to engage with the clutch discs to couple rotational force from the input component to the output component. Because of the lower load to the prime mover from the hydraulic fluid and the lockup clutch already engaged when the prime mover is started, a prime mover start up, from the first fire to idle, or a stable state, is improved.

As the speed of the prime mover increases and settles reaches a stable state, the ECM closes the relief valve and allows the hydraulic fluid in the hydraulic fluid chamber to build hydraulic pressure due to the rotating head of the hydraulic fluid. When the hydraulic pressure reaches above the force applied to the lockup piston by the spring, the lockup piston becomes automatically unbiased. After the lockup piston becomes unbiased, the ECM may operate the torque converter as a conventional hydraulic torque converter where the engagement of the clutch disc is controlled by the pressure in the piston hydraulic passage.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

While aspects of the present disclosure have been particularly shown and described with reference to the examples above, it will be understood by those skilled in the art that various additional embodiments may be contemplated by the modification of the disclosed devices, systems, and methods without departing from the spirit and scope of what is disclosed. Such embodiments should be understood to fall within the scope of the present disclosure as determined based upon the claims and any equivalents thereof.

What is claimed is:

1. A lockup clutch system, comprising:
   one or more clutch discs operational to, when engaged, couple rotational force from an input component to an output component, the one or more clutch discs, the input component, and the output component housed in a hydraulic fluid chamber of a torque converter;
   a lockup piston housed in a piston housing of the torque converter, the lockup piston having a first end portion and a second end portion opposite of the first end portion, the lockup piston operational to:
      engage with the one or more clutch discs when the lockup piston is biased, and
      disengage from the one or more clutch discs when the lockup piston is unbiased;
   a mechanical spring housed in the piston housing and coupled to the lockup piston at the second end portion of the lockup piston, the mechanical spring operational to bias the lockup piston to engage with the one or more clutch discs; and
   a relief valve coupled to the hydraulic fluid chamber, the relief valve operational to, based on a state of a prime mover:
      in an open position, relieve hydraulic pressure from hydraulic fluid in the hydraulic fluid chamber allowing the lockup piston to be biased so as to engage with the one or more clutch discs, and
      in a closed position, allow the hydraulic pressure from the hydraulic fluid in the hydraulic fluid chamber to build up allowing the lockup piston to be unbiased so as to disengage from the one or more clutch discs,
   wherein the relief valve is operational to be in the open position with the prime mover in an off state and with the prime mover in an on state and at a speed less than a preselected speed.

2. The lockup clutch system of claim 1, wherein the mechanical spring is external to the hydraulic fluid chamber of the torque converter.

3. The lockup clutch system of claim 1, wherein the prime mover is an engine.

4. The lockup clutch system of claim 1, wherein the state of the prime mover comprises the on state, the off state, and the speed of the prime mover.

5. The lockup clutch system of claim 1, wherein, in the on state of the prime mover, the relief valve is further operational to remain in the open position until the speed of the prime mover remains greater than the preselected speed for a preselected period of time.

6. The lockup clutch system of claim 5, wherein the preselected speed is lower than an idle speed of the prime mover by a preselected amount.

7. The lockup clutch system of claim 5, wherein the relief valve is further operational to change from the open position to the closed position after the speed of the prime mover remains greater than the preselected speed for the preselected period of time.

8. The lockup clutch system of claim 7, wherein the relief valve is further operational to remain in the closed position while the speed of the prime mover is greater than the preselected speed.

9. The lockup clutch system of claim 8, wherein the relief valve is further operational to change from the closed position to the open position in response to the state of the prime mover changing from the on state to the off state.

10. The lockup clutch system of claim 1, further comprising:
   an electronic control module (ECM) coupled to the prime mover and the relief valve, the ECM operational to monitor the state of the prime mover and control the relief valve based on the state of the prime mover.

11. A machine, comprising:
   a frame;
   a prime mover supported by the frame;
   a torque converter coupled to the prime mover and supported by the frame, the torque converter housing a lockup clutch system, the lockup clutch system including:
      one or more clutch discs operational to, when engaged, couple rotational force from an input component to an output component in the torque converter, the one or more clutch discs, the input component, and the output component housed in a hydraulic fluid chamber of the torque converter, a lockup piston housed in a piston housing of the torque converter; the lockup piston having a first end portion and a second end portion opposite of the first end portion, the lockup piston operational to:
- engage with the one or more clutch discs when the lockup piston is biased, and
- disengage from the one or more clutch discs when the lockup piston is unbiased, and a mechanical spring housed in the piston housing and coupled to the lockup piston at the second end portion of the lockup piston, the mechanical spring operational to bias the lockup piston to engage with the one or more clutch discs;

a relief valve coupled to the hydraulic fluid chamber, the relief valve operational to, based on a state of the prime mover:
- in an open position, relieve hydraulic pressure from hydraulic fluid in the hydraulic fluid chamber allowing the lockup piston to be biased, and
- in a closed position, allow the hydraulic pressure from the hydraulic fluid in the hydraulic fluid chamber to build up allowing the lockup piston to be unbiased; and an electronic control module (ECM) coupled to the prime mover and the relief valve, the ECM operational to monitor the state of the prime mover and control the relief valve based on the state of the prime mover.

12. The machine of claim 11, wherein the mechanical spring is external to the hydraulic fluid chamber of the torque converter.

13. The machine of claim 11, wherein the state of the prime mover comprises at least one of an engine-on state, an engine-off state, and an engine speed.

14. The machine of claim 13, wherein, in the engine-on state, the relief valve is further operational to remain in the open position until the engine speed remains greater than a preselected engine speed for a preselected period of time.

15. The machine of claim 14, wherein the preselected engine speed is lower than an idle speed of the prime mover by a preselected amount.

16. The machine of claim 14, wherein the relief valve is further operational to change from the open position to the closed position after the engine speed remains greater than the preselected engine speed for the preselected period of time.

17. The machine of claim 16, wherein the relief valve is further operational to remain in the closed position while the engine speed is greater than the preselected engine speed.

18. The machine of claim 17, wherein the relief valve is further operational to change from the closed position to the open position in response to the state of the prime mover changing from the engine-on state to the engine-off state.

19. A method, comprising:
- monitoring, by an electronic control module (ECM) of a machine, a state of a prime mover of the machine;
- determining, by the ECM, the state of the prime mover;
- in response to determining, by the ECM, the state of the prime mover has changed from an engine-off state to an engine-on state:
  - opening a relief valve coupled to a hydraulic fluid chamber of a torque converter of the machine, the hydraulic fluid chamber housing one or more clutch discs, an input component, and an output component,
  - relieving hydraulic pressure from hydraulic fluid in the hydraulic fluid chamber, and
  - biasing, by a mechanical spring, a lockup piston to engage with the one or more clutch discs to couple rotational force from the input component to the output component, the mechanical spring and the lockup piston housed in a piston housing of the torque converter; and
- in response to determining, by the ECM, the state of the prime mover has reached a stable state:
  - closing the relief valve,
  - allowing the hydraulic pressure from the hydraulic fluid in the hydraulic fluid chamber to build up, and
  - allowing the lockup piston to be unbiased to disengage from the one or more clutch discs,
- wherein the stable state is based, at least in part, on a speed of the prime mover remaining greater than a preselected engine speed for a preselected period of time, the preselected engine speed lower than an idle speed of the prime mover by a preselected amount.

20. The method of claim 19, wherein the mechanical spring is external to the hydraulic fluid chamber of the torque converter.

* * * * *